US009858934B2

(12) United States Patent
Porov et al.

(10) Patent No.: US 9,858,934 B2
(45) Date of Patent: Jan. 2, 2018

(54) AUDIO-ENCODING METHOD AND APPARATUS, AUDIO-DECODING METHOD AND APPARATUS, RECODING MEDIUM THEREOF, AND MULTIMEDIA DEVICE EMPLOYING SAME

(71) Applicant: SAMSUNG ELECTRONICS CO., LTD., Suwon-si (KR)

(72) Inventors: Anton Porov, Saint-Petersburg (RU); Konstantin Osipov, Saint-Petersburg (RU); Ki-hyun Choo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/450,672

(22) Filed: Mar. 6, 2017

(65) Prior Publication Data

US 2017/0178637 A1 Jun. 22, 2017

Related U.S. Application Data

(63) Continuation of application No. 15/142,594, filed on Apr. 29, 2016, now Pat. No. 9,589,569, which is a (Continued)

(30) Foreign Application Priority Data

Jun. 1, 2011 (RU) ................................ 2011121982

(51) Int. Cl.
*G06F 17/28* (2006.01)
*G10L 19/00* (2013.01)
(Continued)

(52) U.S. Cl.
CPC ........ *G10L 19/0017* (2013.01); *G10L 19/002* (2013.01); *G10L 19/008* (2013.01); (Continued)

(58) Field of Classification Search
CPC ............. G10L 19/0204; G10L 19/0017; G10L 21/038; G10L 19/002; G10L 19/008
(Continued)

(56) References Cited

U.S. PATENT DOCUMENTS 5,687,191 A 11/1997 Lee et al.
5,924,064 A 7/1999 Helf
(Continued)

FOREIGN PATENT DOCUMENTS

CN 1784020 A 6/2006
CN 1898724 A 1/2007
(Continued)

OTHER PUBLICATIONS

Communication dated Dec. 27, 2016, issued by the Taiwanese Patent Office in counterpart Taiwanese Application No. 105134207.
(Continued)

*Primary Examiner* — Charlotte M Baker
(74) *Attorney, Agent, or Firm* — Sughrue Mion, PLLC

(57) ABSTRACT

Provided is an audio encoding method. The audio encoding method includes: acquiring envelopes based on a predetermined sub-band for an audio spectrum; quantizing the envelopes based on the predetermined sub-band; and obtaining a difference value between quantized envelopes for adjacent sub-bands and lossless encoding a difference value of a current sub-band by using a difference value of a previous sub-band as a context. Accordingly, the number of bits required to encode envelope information of an audio spectrum may be reduced in a limited bit range, thereby increasing the number of bits required to encode an actual spectral component.

11 Claims, 10 Drawing Sheets

Related U.S. Application Data continuation of application No. 14/123,359, filed as application No. PCT/KR2012/004362 on Jun. 1, 2012, now Pat. No. 9,361,895.

(51) Int. Cl.
*G10L 19/02* (2013.01)
*G10L 19/008* (2013.01)
*G10L 19/002* (2013.01)
*G10L 19/032* (2013.01)
*G10L 19/16* (2013.01)

(52) U.S. Cl.
CPC ........ *G10L 19/0204* (2013.01); *G10L 19/032* (2013.01); *G10L 19/167* (2013.01)

(58) Field of Classification Search
USPC .... 704/235, 500, 200, 200.1, 201, 219, 221, 704/222, 223, 501, 502, 5
See application file for complete search history.

(56) References Cited

U.S. PATENT DOCUMENTS

| | | | |
|---|---|---|---|
| 6,484,142 | B1 | 11/2002 | Miyasaka et al. |
| 7,693,707 | B2 | 4/2010 | Yamanashi et al. |
| 7,756,715 | B2 | 7/2010 | Kim et al. |
| 8,019,601 | B2 | 9/2011 | Eguchi |
| 8,103,516 | B2 | 1/2012 | Oshikiri |
| 8,315,880 | B2 | 11/2012 | Kovesi et al. |
| 8,494,863 | B2 | 7/2013 | Biswas et al. |
| 8,515,767 | B2 * | 8/2013 | Reznik .................... G10L 19/24 704/200 |
| 8,892,449 | B2 | 11/2014 | Lecomte et al. |
| 2002/0169601 | A1 | 11/2002 | Nishio |
| 2003/0014136 | A1 | 1/2003 | Wang et al. |
| 2005/0015249 | A1 | 1/2005 | Mehrotra et al. |
| 2005/0091040 | A1 | 4/2005 | Nam et al. |
| 2009/0240491 | A1 | 9/2009 | Reznik |
| 2010/0228541 | A1 | 9/2010 | Oshikiri |

FOREIGN PATENT DOCUMENTS

| | | | |
|---|---|---|---|
| CN | 101317217 | A | 12/2008 |
| CN | 101849258 | A | 9/2010 |
| CN | 101898724 | A | 12/2010 |
| EP | 2 767 977 | A2 | 8/2014 |
| JP | 2000132193 | A | 5/2000 |
| JP | 2002-268693 | A | 9/2002 |
| JP | 2003-29797 | A | 1/2003 |
| JP | 2003-233397 | A | 8/2003 |
| JP | 2004258603 | A | 9/2004 |
| JP | 2008-83295 | A | 4/2008 |
| KR | 1020060060928 | A | 6/2006 |
| RU | 2 236 046 | C2 | 1/2004 |
| RU | 2 289 858 | C2 | 12/2006 |
| RU | 2464649 | C1 | 10/2012 |
| TW | 201007705 | A1 | 2/2010 |
| WO | 0140979 | A2 | 6/2001 |
| WO | 2007/052088 | A1 | 5/2007 |
| WO | 2007/096551 | A2 | 8/2007 |

OTHER PUBLICATIONS

Communication dated May 30, 2016 issued by Mexican Institute of Industrial Property in counterpart Mexican Patent Application No. MX/a/2015/014526.

Communication dated Aug. 2, 2016 issued by Japanese Intellectual Property Office in counterpart Japanese Application No. 2014-513447.

"ITU-T G.719, Low-Complexity, Full-Band Audio Coding for High Quality, Conversational Applications", Transmission Systems and Media, Digital Sysems and Networks Digital Terminal Equipments—Coding of Analogue Signals, Jun. 30, 2008, p. 1-58, XP055055552.

Bosi M et al: "ISO/IEC MPEG-2 Advanced Audio Coding", Journal of the Audio Engineering Society, Audio Engineering Society, New York, NY,US, vol. 45, No. 10, Oct. 1, 1997, p. 789-812, XP000730161.

Communication dated Apr. 12, 2016, issued by the State Intellectual Property Office of P.R. China in counterpart Chinese Application No. 201280037719.1.

Communication dated Feb. 18, 2016, issued by the Taiwanese Patent Office in counterpart Taiwanese Application No. 101119835.

Communication dated Sep. 25, 2014 issued by the European Patent Office in counterpart European Patent Application No. 12791983.5.

Communication dated Jul. 21, 2015, issued by the Intellectual Property Office of the People's Republic of China in counterpart Chinese Patent Application No. 201280037719.1.

Communication dated Jan. 12, 2015 by the Mexican Patent Office in related Mexican Application No. MX/a/2013/014152.

International Search Report dated Jan. 2, 2013 from the International Searching Authority in counterpart application No. PCT/KR2012/004362.

Office Action dated Sep. 17, 2015 in U.S. Appl. No. 14/123,359.

Notice of Allowance dated Jan. 21, 2016 in U.S. Appl. No. 14/123,359.

Communication dated Feb. 27, 2012, issued by the Russian Patent Office in counterpart Russian Application No. 2011121982.

Communication dated Jan. 27, 2017 issued by Mexican Institute of Industrial Property in counterpart Mexican Patent Application No. MX/a/2015/014526.

Communication dated Apr. 11, 2017, issued by the Japanese Patent Office in counterpart Japanese Application No. 2014-513447.

Communication issued by the Mexican Patent Office dated Jul. 25, 2017 in counterpart Mexican Patent Application No. MX/a/2015/014526.

* cited by examiner

AUDIO-ENCODING METHOD AND APPARATUS, AUDIO-DECODING METHOD AND APPARATUS, RECODING MEDIUM THEREOF, AND MULTIMEDIA DEVICE EMPLOYING SAME

CROSS-REFERENCE TO RELATED APPLICATIONS

This is a continuation of U.S. application Ser. No. 15/142,594, filed Apr. 29, 2016, which is a continuation of U.S. application Ser. No. 14/123,359, filed Jan. 29, 2014, now U.S. Pat. No. 9,361,895, issued Jun. 7, 2016, which is a National Stage of International Application No. PCT/KR2012/004362 filed Jun. 1, 2012, claiming priority from Russian Application No. 2011121982 filed Jun. 1, 2011 in the Russian Patent Office, the disclosures of which are incorporated herein by reference.

BACKGROUND

1. Technical Field

Apparatuses and methods consistent with exemplary embodiments relate to audio encoding/decoding, and more particularly, to an audio encoding method and apparatus capable of increasing the number of bits required to encode an actual spectral component by reducing the number of bits required to encode envelope information of an audio spectrum in a limited bit range without increasing complexity and deterioration of restored sound quality, an audio decoding method and apparatus, a recording medium and a multimedia device employing the same.

2. Description of Related Art

When an audio signal is encoded, additional information, such as an envelope, in addition to an actual spectral component may be included in a bitstream. In this case, by reducing the number of bits allocated to encoding of the additional information while minimizing loss, the number of bits allocated to encoding of the actual spectral component may be increased.

That is, when an audio signal is encoded or decoded, it is required to reconstruct the audio signal having the best sound quality in a corresponding bit range by efficiently using a limited number of bits at a specifically low bit rate.

SUMMARY

Aspects of one or more exemplary embodiments provide an audio encoding method and apparatus capable of increasing the number of bits required to encode an actual spectral component while reducing the number of bits required to encode envelope information of an audio spectrum in a limited bit range without increasing complexity and deterioration of restored sound quality, an audio decoding method and apparatus, a recording medium and a multimedia device employing the same.

According to an aspect of one or more exemplary embodiments, there is provided an audio encoding method including: acquiring envelopes based on a predetermined sub-band for an audio spectrum; quantizing the envelopes based on the predetermined sub-band; and obtaining a difference value between quantized envelopes for adjacent sub-bands and lossless encoding a difference value of a current sub-band by using a difference value of a previous sub-band as a context.

According to an aspect of one or more exemplary embodiments, there is provided an audio encoding apparatus including: an envelope acquisition unit to acquire envelopes based on a predetermined sub-band for an audio spectrum; an envelope quantizer to quantize the envelopes based on the predetermined sub-band; an envelope encoder to obtain a difference value between quantized envelopes for adjacent sub-bands and lossless encoding a difference value of a current sub-band by using a difference value of a previous sub-band as a context; and a spectrum encoder to quantize and lossless encode the audio spectrum.

According to an aspect of one or more exemplary embodiments, there is provided an audio decoding method including: obtaining a difference value between quantized envelopes for adjacent sub-bands from a bitstream and lossless decoding a difference value of a current sub-band by using a difference value of a previous sub-band as a context; and performing dequantization by obtaining quantized envelopes based on a sub-band from a difference value of a current sub-band reconstructed as a result of the lossless decoding.

According to an aspect of one or more exemplary embodiments, there is provided an audio decoding apparatus including: an envelope decoder to obtain a difference value between quantized envelopes for adjacent sub-bands from a bitstream and lossless decoding a difference value of a current sub-band by using a difference value of a previous sub-band as a context; an envelope dequantizer to perform dequantization by obtaining quantized envelopes based on a sub-band from a difference value of a current sub-band reconstructed as a result of the lossless decoding; and a spectrum decoder to lossless decode and dequantize a spectral component included in the bitstream.

According to an aspect of one or more exemplary embodiments, there is provided a multimedia device including an encoding module to acquire envelopes based on a predetermined sub-band for an audio spectrum, to quantize the envelopes based on the predetermined sub-band, to obtain a difference value between quantized envelopes for adjacent sub-bands, and to lossless encode a difference value of a current sub-band by using a difference value of a previous sub-band as a context.

The multimedia device may further include a decoding module to obtain a difference value between quantized envelopes for adjacent sub-bands from a bitstream, to lossless decode a difference value of a current sub-band by using a difference value of a previous sub-band as a context, and to perform dequantization by obtaining quantized envelopes based on a sub-band from the difference value of the current sub-band reconstructed as a result of the lossless decoding.

The number of bits required to encode an actual spectral component may be increased by reducing the number of bits required to encode envelope information of an audio spectrum in a limited bit range without increasing complexity and deterioration of restored sound quality.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION OF EXEMPLARY EMBODIMENTS

Figure 1:
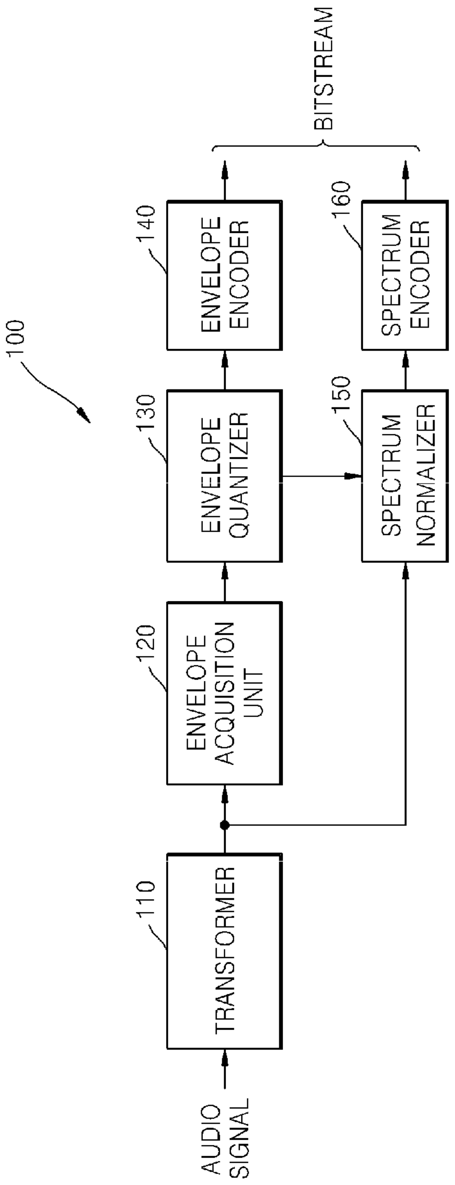
FIG. 1 is a block diagram of a digital signal processing apparatus according to an exemplary embodiment.

The exemplary embodiments may allow various kinds of change or modification and various changes in form, and specific embodiments will be illustrated in drawings and described in detail in the specification. However, it should be understood that the specific embodiments do not limit the the present inventive concept to a specific disclosing form but include every modified, equivalent, or replaced one within the spirit and technical scope of the present the present inventive concept. In the following description, well-known functions or constructions are not described in detail since they would obscure the inventive concept with unnecessary detail.

Although terms, such as 'first' and 'second', may be used to describe various elements, the elements may not be limited by the terms. The terms may be used to classify a certain element from another element.

The terminology used in the application is used only to describe specific embodiments and does not have any intention to limit the present inventive concept. Although general terms as currently widely used as possible are selected as the terms used in the present inventive concept while taking functions in the present inventive concept into account, they may vary according to an intention of those of ordinary skill in the art, judicial precedents, or the appearance of new technology. In addition, in specific cases, terms intentionally selected by the applicant may be used, and in this case, the meaning of the terms will be disclosed in corresponding description of the inventive concept. Accordingly, the terms used in the present inventive concept should be defined not by simple names of the terms but by the meaning of the terms and the content over the present inventive concept.

An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

Hereinafter, the present inventive concept will be described more fully with reference to the accompanying drawings, in which exemplary embodiments of the inventive concept are shown. Like reference numerals in the drawings denote like elements, and thus their repetitive description will be omitted.

Expressions such as "at least one of," when preceding a list of elements, modify the entire list of elements and do not modify the individual elements of the list.

FIG. 1 is a block diagram of a digital signal processing apparatus 100 according to an exemplary embodiment.

The digital signal processing apparatus 100 shown in FIG. 1 may include a transformer 110, an envelope acquisition unit 120, an envelope quantizer 130, an envelope encoder 140, a spectrum normalizer 150, and a spectrum encoder 160. The components of the digital signal processing apparatus 100 may be integrated in at least one module and implemented by at least one processor. Here, a digital signal may indicate a media signal, such as video, an image, audio or voice, or a sound indicating a signal obtained by synthesizing audio and voice, but hereinafter, the digital signal generally indicates an audio signal for convenience of description.

Referring to FIG. 1, the transformer 110 may generate an audio spectrum by transforming an audio signal from a time domain to a frequency domain. The time to frequency domain transform may be performed by using various well-known methods such as Modified Discrete Cosine Transform (MDCT). For example, MDCT for an audio signal in the time domain may be performed using Equation 1.

$$x_i = \sum_{j=0}^{2N-1} h_j s_j \cos[\pi(j + (N+1)/2)(i + 1/2)/N], \quad i = 0, \ldots, N-1 \qquad (1)$$

In Equation 1, N denotes the number of samples included in a single frame, i.e., a frame size, $h_j$ denotes an applied window, $s_j$ denotes an audio signal in the time domain, and $x_i$ denotes an MDCT coefficient. Alternatively, a sine window, e.g., $h_j=\sin[\pi(j+1/2)/2N]$, may be used instead of the cosine window of Equation 1.

Transform coefficients, e.g., the MDCT coefficient $x_i$, of the audio spectrum, which are obtained by the transformer 110, are provided to the envelope acquisition unit 120.

The envelope acquisition unit 120 may acquire envelope values based on a predetermined sub-band from the transform coefficients provided from the transformer 110. A sub-band is a unit of grouping samples of the audio spectrum and may have a uniform or non-uniform length by reflecting a critical band. When sub-bands have non-uniform lengths, the sub-bands may be set so that the number of samples included in each sub-band from a starting sample to a last sample gradually increases for one frame. In addition, when multiple bit rates are supported, it may be set so that the number of samples included in each of corresponding sub-bands at different bit rates is the same. The number of sub-bands included in one frame or the number of samples included in each sub-band may be previously determined. An envelope value may indicate average amplitude, average energy, power, or a norm value of transform coefficients included in each sub-band.

An envelope value of each sub-band may be calculated using Equation 2, but is not limited thereto.

$$n = \sqrt{\frac{1}{w}\sum_{i=1}^{w} x_i^2} \quad (2)$$

In Equation 2, w denotes the number of transform coefficients included in a sub-band, i.e., a sub-band size, $x_i$ denotes a transform coefficient, and n denotes an envelope value of the sub-band.

The envelope quantizer 130 may quantize an envelope value n of each sub-band in an optimized logarithmic scale. A quantization index $n_q$ of the envelope value n of each sub-band, which is obtained by the envelope quantizer 130, may be obtained using, for example, Equation 3.

$$n_q = \left\lfloor \frac{1}{r}\log_c n + \frac{b}{r} \right\rfloor \quad (3)$$

In Equation 3, b denotes a rounding coefficient, and an initial value thereof before optimization is r/2. In addition, c denotes a base of the logarithmic scale, and r denotes quantization resolution.

According to an embodiment, the envelope quantizer 130 may variably change left and right boundaries of a quantization area corresponding to each quantization index so that a total quantization error in the quantization area corresponding to each quantization index is minimized. To do as so, the rounding coefficient b may be adjusted so that left and right quantization errors obtained between the quantization index and the left and right boundaries of the quantization area corresponding to each quantization index are identical to each other. A detailed operation of the envelope quantizer 130 is described below.

Dequantization of the quantization index $n_q$ of the envelope value n of each sub-band may be performed by Equation 4.

$$\tilde{n} = c^{rn_q} \quad (4)$$

In Equation 4, ñ denotes a dequantized envelope value of each sub-band, r denotes quantization resolution, and c denotes a base of the logarithmic scale.

The quantization index $n_q$ of the envelope value n of each sub-band, which is obtained by the envelope quantizer 130, may be provided to the envelope encoder 140, and the dequantized envelope value ñ of each sub-band may be provided to the spectrum normalizer 150.

Although not shown, envelope values obtained based on a sub-band may be used for bit allocation required to encode a normalized spectrum, i.e., a normalized coefficient. In this case, envelope values quantized and lossless encoded based on a sub-band may be included in a bitstream and provided to a decoding apparatus. In association with the bit allocation using the envelope values obtained based on a sub-band, a dequantized envelope value may be applied to use the same process in an encoding apparatus and a corresponding decoding apparatus.

For example, when an envelope value is a norm value, a masking threshold may be calculated using a norm value based on a sub-band, and the perceptually required number of bits may be predicted using the masking threshold. That is, the masking threshold is a value corresponding to Just Noticeable Distortion (JND), and when quantization noise is less than the masking threshold, perceptual noise may not be sensed. Thus, the minimum number of bits required not to sense the perceptual noise may be calculated using the masking threshold. For example, a Signal-to-Mask Ratio (SMR) may be calculated using a ratio of a norm value to the masking threshold based on a sub-band, and the number of bits satisfying the masking threshold may be predicted using a relationship of 6.025 dB ≒ 1 bit for the SMR. Although the predicted number of bits is the minimum number of bits required not to sense the perceptual noise, there is no need to use more than the predicted number of bits in terms of compression, so the predicted number of bits may be considered as the maximum number of bits allowed based on a sub-band (hereinafter, referred to as the allowable number of bits). The allowable number of bits of each sub-band may be represented in decimal point units but is not limited thereto.

In addition, the bit allocation based on a sub-band may be performed using norm values in decimal point units but is not limited thereto. Bits are sequentially allocated from a sub-band having a larger norm value, and allocated bits may be adjusted so that more bits are allocated to a perceptually more important sub-band by weighting a norm value of each sub-band based on its perceptual importance. The perceptual importance may be determined through, for example, psycho-acoustic weighting defined in ITU-T G.719.

The envelope encoder 140 may obtain a quantization delta value for the quantization index $n_q$ of the envelope value n of each sub-band, which is provided from the envelope quantizer 130, may perform lossless encoding based on a context for the quantization delta value, may include a lossless encoding result into a bitstream, and may transmit and store the bitstream. A quantization delta value of a previous sub-band may be used as the context. A detailed operation of the envelope encoder 140 is described below.

The spectrum normalizer 150 makes spectrum average energy be 1 by normalizing a transform coefficient as $y_i = x_i/\tilde{n}$ by using the dequantized envelope value $\tilde{n} = c^{rn_q}$ of each sub-band.

The spectrum encoder 160 may perform quantization and lossless encoding of the normalized transform coefficient, may include a quantization and lossless encoding result into a bitstream, and may transmit and store the bitstream. Here, the spectrum encoder 160 may perform quantization and lossless encoding of the normalized transform coefficient by using the allowable number of bits that is finally determined based on the envelope values based on a sub-band.

The lossless encoding of the normalized transform coefficient may use, for example, Factorial Pulse Coding (FPC). FPC is a method of efficiently encoding an information signal by using unit magnitude pulses. According to FPC, information content may be represented with four components, i.e., the number of non-zero pulse positions, positions of non-zero pulses, magnitudes of the non-zero pulses, and signs of the non-zero pulses. In detail, FPC may determine an optimal solution of $\tilde{y} = \{\tilde{y}_1, \tilde{y}_2, \tilde{y}_3, \ldots, \tilde{y}_{k-1}\}$ based on a Mean Square Error (MSE) standard in which a difference between an original vector y of a sub-band and an FPC vector ỹ is minimized while satisfying $$m = \sum_{i=0}^{k-1} |\tilde{y}_i|$$

(m denotes the total number of unit magnitude pulses).

The optimal solution may be obtained by finding a conditional extreme value using the Lagrangian function as in Equation 5.

$$L = \sum (y_i - \tilde{y}_i)^2 + \lambda\left(\sum \tilde{y}_i - m\right) \tag{5}$$

$$\begin{cases} \dfrac{\partial L}{\partial \tilde{y}_i} = 2\tilde{y}_i - 2y_i + \lambda\tilde{y}_i = 0 \\ \dfrac{\partial L}{\partial \lambda} = \sum \tilde{y}_i - m = 0 \end{cases}$$

$$\tilde{y}_i = \mathrm{Round}\left(\frac{y_i m}{\sum y_i}\right)$$

In Equation 5, L denotes the Lagrangian function, m denotes the total number of unit magnitude pulses in a sub-band, λ denotes a control parameter for finding the minimum value of a given function as a Lagrange multiplier that is an optimization coefficient, $y_i$ denotes a normalized transform coefficient, and $\tilde{y}_i$ denotes the optimal number of pulses required at a position i.

When the lossless encoding is performed using FPC, $\tilde{y}_i$ of a total set obtained based on a sub-band may be included in a bitstream and transmitted. In addition, an optimum multiplier for minimizing a quantization error in each sub-band and performing alignment of average energy may also be included in the bitstream and transmitted. The optimum multiplier may be obtained by Equation 6.

$$D = \frac{\sum (y_i - G\tilde{y}_i)^2}{\sum y_i^2} \to 0 \tag{6}$$

$$\frac{\partial D}{\partial G} = 0$$

$$G = \frac{\sum y_i \tilde{y}_i}{\sum \tilde{y}_i^2}$$

In Equation 6, D denotes a quantization error, and G denotes an optimum multiplier.

Figure 2:
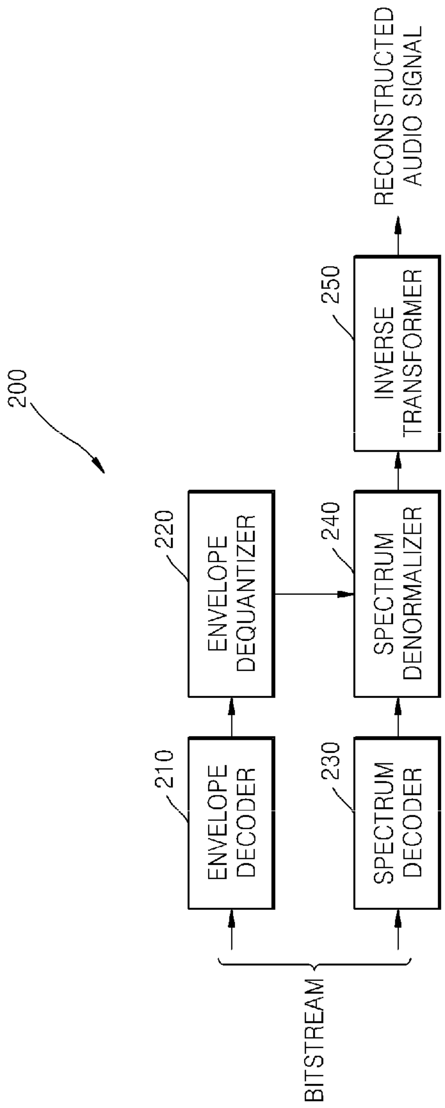
FIG. 2 is a block diagram of a digital signal processing apparatus according to another exemplary embodiment.

FIG. 2 is a block diagram of a digital signal decoding apparatus 200 according to an exemplary embodiment.

The digital signal decoding apparatus 200 shown in FIG. 2 may include an envelope decoder 210, an envelope dequantizer 220, a spectrum decoder 230, a spectrum denormalizer 240, and an inverse transformer 250. The components of the digital signal decoding apparatus 200 may be integrated in at least one module and implemented by at least one processor. Here, a digital signal may indicate a media signal, such as video, an image, audio or voice, or a sound indicating a signal obtained by synthesizing audio and voice, but hereinafter, the digital signal generally indicates an audio signal to correspond to the encoding apparatus of FIG. 1.

Referring to FIG. 2, the envelope decoder 210 may receive a bitstream via a communication channel or a network, lossless decode a quantization delta value of each sub-band included in the bitstream, and reconstruct a quantization index $n_q$ of an envelope value of each sub-band.

The envelope dequantizer 220 may obtain a dequantized envelope value $\tilde{n}=c^{m_q}$ by dequantizing the quantization index $n_q$ of the envelope value of each sub-band.

The spectrum decoder 230 may reconstruct a normalized transform coefficient by lossless decoding and dequantizing the received bitstream. For example, the envelope dequantizer 220 may lossless decode and dequantize $\tilde{y}_i$ of a total set for each sub-band when an encoding apparatus has used FPC. An average energy alignment of each sub-band may be performed using an optimum multiplier G by Equation 7.

$$\tilde{y}_i = \tilde{y}_i G \tag{7}$$

The spectrum decoder 230 may perform lossless decoding and dequantization by using the allowable number of bits finally determined based on envelope values based on a sub-band as in the spectrum encoder 160 of FIG. 1.

The spectrum denormalizer 240 may denormalize the normalized transform coefficient provided from the envelope decoder 210 by using the dequantized envelope value provided from the envelope dequantizer 220. For example, when the encoding apparatus has used FPC, $\tilde{y}_i$ for which energy alignment is performed is denormalized using the dequantized envelope value ñ by $\tilde{x}_i=\tilde{y}_i\tilde{n}$. By performing the denormalization, original spectrum average energy of each sub-band is reconstructed.

The inverse transformer 250 may reconstruct an audio signal in the time domain by inverse transforming the transform coefficient provided from the spectrum denormalizer 240. For example, an audio signal $s_j$ in the time domain may be obtained by inverse transforming the spectral component $\tilde{x}_i$ using Equation 8 corresponding to Equation 1.

$$s_j = \frac{1}{N} h_j \sum_{i=0}^{N-1} x_i \cos[\pi(j + (N+1)/2)(i + 1/2)/N], \tag{8}$$

$$j = 0, \ldots, 2N-1$$

Hereinafter, an operation of the envelope quantizer 130 of FIG. 1 will be described in more detail.

When the envelope quantizer 130 quantizes an envelope value of each sub-band in the logarithmic scale of which a base is c, a boundary $B_i$ of a quantization area corresponding to a quantization index may be represented by $B_i=c^{(S_i+S_{i+1})/2}$, an approximating point, i.e., a quantization index, $A_i$ may be represented by $A_i=c^{S_i}$, quantization resolution r may be represented by $r=S_i-S_{i-1}$, and a quantization step size may be represented by $20\lg A_i - 20\lg A_{i-1} = 20r\lg c$. The quantization index $n_q$ of the envelope value n of each sub-band may be obtained by Equation 3.

Figure 3A:
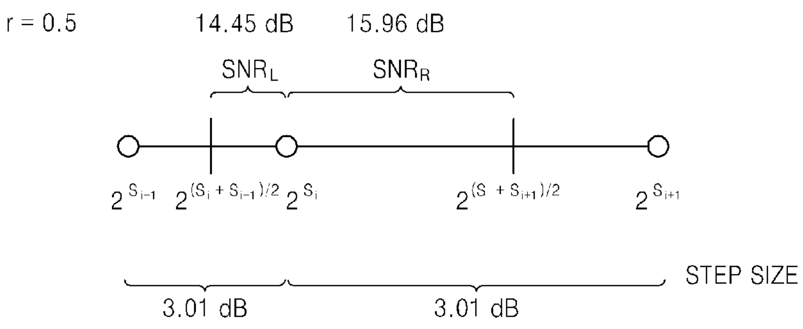
FIGS. 3A and 3B show a non-optimized logarithmic scale and an optimized logarithmic scale compared with each other when quantization resolution is 0.5 and a quantization step size is 3.01, respectively.
Figure 4A:
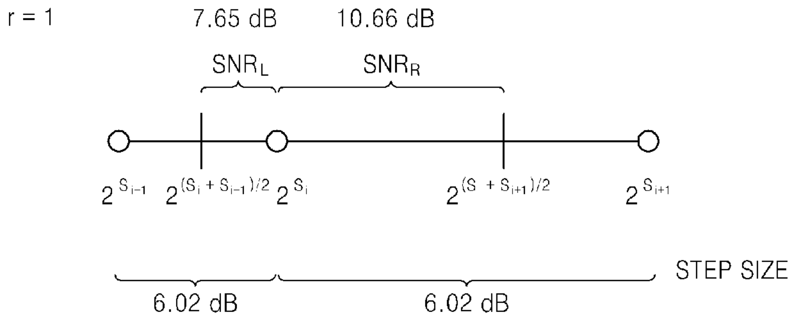
FIGS. 4A and 4B show a non-optimized logarithmic scale and an optimized logarithmic scale compared with each other when quantization resolution is 1 and a quantization step size is 6.02, respectively.

In a case of a non-optimized linear scale, left and right boundaries of the quantization area corresponding to the quantization index $n_q$ are apart by different distances from an approximating point. Due to this difference, a Signal-to-Noise Ratio (SNR) measure for quantization, i.e., a quantization error, has different values for the left and right boundaries from the approximating point as shown in FIGS. 3A and 4A. FIG. 3A shows quantization in a non-optimized logarithmic scale (base is 2) in which quantization resolution is 0.5 and a quantization step size is 3.01. As shown in FIG. 3A, quantization errors $SNR_L$ and $SNR_R$ from an approximating point at left and right boundaries in a quantization area are 14.46 dB and 15.96 dB, respectively. FIG. 4A shows quantization in a non-optimized logarithmic scale (base is 2) in which quantization resolution is 1 and a quantization step size is 6.02. As shown in FIG. 4A, quantization errors $SNR_L$ and $SNR_R$ from an approximating point at left and right boundaries in a quantization area are 7.65 dB and 10.66 dB, respectively.

According to an embodiment, by variably changing a boundary of a quantization area corresponding to a quantization index, a total quantization error in a quantization area corresponding to each quantization index may be minimized. The total quantization error in the quantization area may be minimized when quantization errors obtained at left and right boundaries in the quantization area from an approximating point are the same. A boundary shift of the quantization area may be obtained by variably changing a rounding coefficient b.

Quantization errors $SNR_L$ and $SNR_R$ obtained at left and right boundaries in a quantization area corresponding to a quantization index i from an approximating point may be represented by Equation 9.

$$SNR_L = -20lg((c^{S_i} - c^{(S_i+S_{i-1})/2})/c^{(S_i+S_{i-1})/2})$$

$$SNR_R = -20lg((c^{(S_i+S_{i+1})/2} - c^{S_i})/c^{(S_i+S_{i-1})/2}) \quad (9)$$

In Equation 9, c denotes a base of a logarithmic scale, and $S_i$ denotes an exponent of a boundary in the quantization area corresponding to the quantization index i.

Exponent shifts of the left and right boundaries in the quantization area corresponding to the quantization index may be represented using parameters $b_L$ and $b_R$ defined by Equation 10.

$$b_L = S_i - (S_i + S_{i-1})/2$$

$$b_R = (S_i + S_{i+1})/2 - S_i \quad (10)$$

In Equation 10, $S_i$ denotes the exponent at the boundary in the quantization area corresponding to the quantization index i, and $b_L$ and $b_R$ denote exponent shifts of the left and right boundaries in the quantization area from the approximating point.

A sum of the exponent shifts at the left and right boundaries in the quantization area from the approximating point is the same as the quantization resolution, and accordingly, may be represented by Equation 11.

$$b_L + b_R = r \quad (11)$$

A rounding coefficient is the same as the exponent shift at the left boundary in the quantization area corresponding to the quantization index from the approximating point based on a general characteristic of quantization. Thus, Equation 9 may be represented by Equation 12.

$$SNR_L = -20lg((c^{S_i} - c^{S_i+b_L})/c^{S_i+b_L} = -20lg(c^{b_L} - 1)$$

$$SNR_R = -20lg((c^{S_i+b_R} - c^{S_i})/c^{S_i+b_R} = -20lg(1 - c^{-r+b_L}) \quad (12)$$

By making the quantization errors $SNR_L$ and $SNR_R$ at the left and right boundaries in the quantization area corresponding to the quantization index from the approximating point be the same, the parameter $b_L$ may be determined by Equation 13.

$$-20lg(c^{b_L} - 1) = -20lg(1 - c^{-r+b_L})$$

$$c = c^{b_L} + c^{-r+b_L} = c^{b_L}(1 + c^{-r}) \quad (13)$$

Thus, a rounding coefficient $b_L$ may be represented by Equation 14.

$$b_L = 1 - \log_c(1 + c^{-r}) \quad (14)$$

Figure 3B:
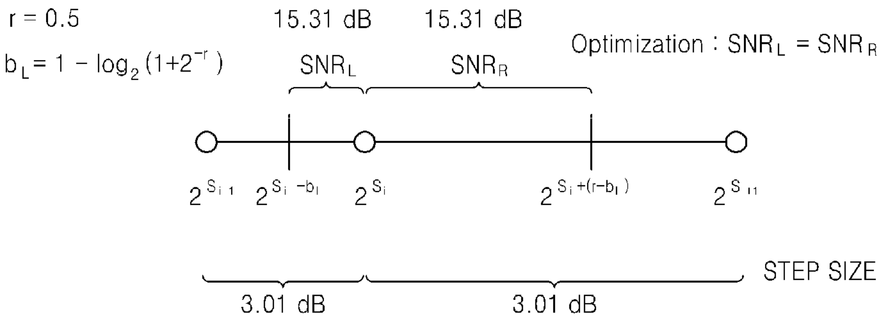
Figure 4B:
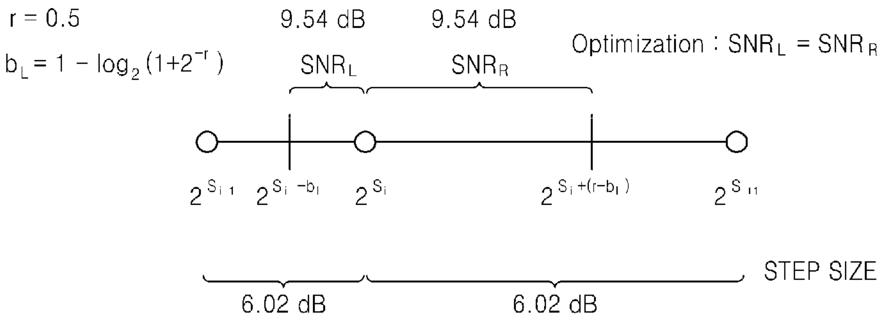

FIG. 3B shows quantization in an optimized logarithmic scale (base is 2) in which quantization resolution is 0.5 and a quantization step size is 3.01. As shown in FIG. 3B, both quantization errors $SNR_L$ and $SNR_R$ from an approximating point at left and right boundaries in a quantization area are 15.31 dB. FIG. 4B shows quantization in an optimized logarithmic scale (base is 2) in which quantization resolution is 1 and a quantization step size is 6.02. As shown in FIG. 4B, both quantization errors $SNR_L$ and $SNR_R$ from an approximating point at left and right boundaries in a quantization area are 9.54 dB.

The rounding coefficient $b = b_L$ determines an exponent distance from each of the left and right boundaries in the quantization area corresponding to the quantization index i to the approximating point. Thus, the quantization according to an embodiment may be performed by Equation 15.

$$n_q = \left\lfloor \frac{1}{r}\log_c n + \frac{b_L}{r} \right\rfloor \quad (15)$$

Figure 5A:
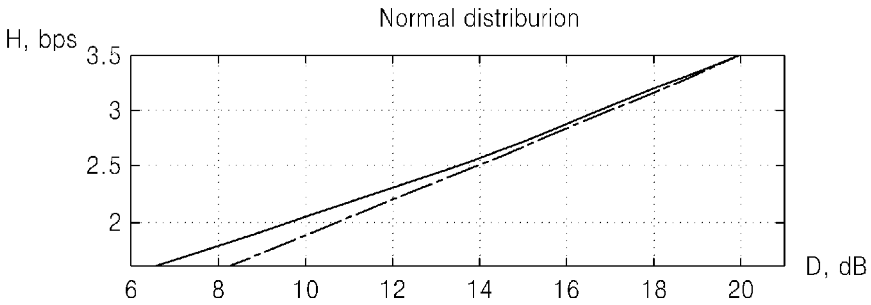
FIGS. 5A and 5B are graphs showing a quantization result of a non-optimized logarithmic scale and a quantization result of an optimized logarithmic scale, which are compared with each other, respectively.
Figure 5B:
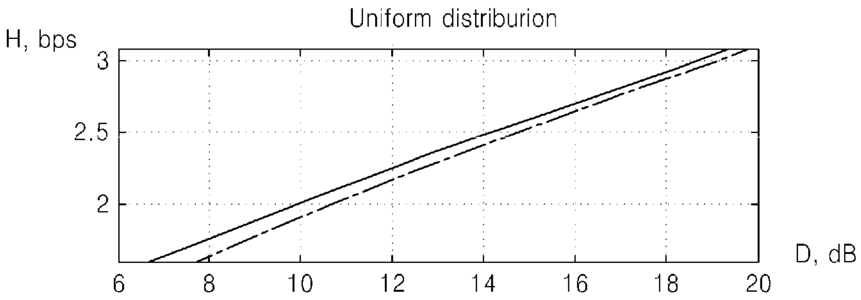

Test results obtained by performing the quantization in a logarithmic scale of which a base is 2 are shown in FIGS. 5A and 5B. According to an information theory, a bit rate-distortion function H(D) may be used as a reference by which various quantization methods may be compared and analyzed. Entropy of a quantization index set may be considered as a bit rate and have a dimension b/s, and an SNR in a dB scale may be considered as a distortion measure.

FIG. 5A is a comparison graph of quantization performed in a normal distribution. In FIG. 5A, a solid line indicates a bit rate-distortion function of quantization in the non-optimized logarithmic scale, and a chain line indicates a bit rate-distortion function of quantization in the optimized logarithmic scale. FIG. 5B is a comparison graph of quantization performed in a uniform distribution. In FIG. 5B, a solid line indicates a bit rate-distortion function of quantization in the non-optimized logarithmic scale, and a chain line indicates a bit rate-distortion function of quantization in the optimized logarithmic scale. Samples in the normal and uniform distributions are generated using a random number of sensors according to corresponding distribution laws, a zero expectation value, and a single variance. The bit rate-distortion function H(D) may be calculated for various quantization resolutions. As shown in FIGS. 5A and 5B, the chain lines are located below the solid lines, which indicates that the performance of the quantization in the optimized logarithmic scale is better than the performance of the quantization in the non-optimized logarithmic scale.

That is, according to the quantization in the optimized logarithmic scale, the quantization may be performed with a less quantization error at the same bit rate or performed using a less number of bits with the same quantization error at the same bit rate. Test results are shown in Tables 1 and 2, wherein Table 1 shows the quantization in the non-optimized logarithmic scale, and Table 2 shows the quantization in the optimized logarithmic scale.

TABLE 1

| Quantization resolution (r) | 2.0 | 1.0 | 0.5 |
|---|---|---|---|
| Rounding coefficient (b/r) | 0.5 | 0.5 | 0.5 |
| Normal distribution | | | |
| Bit rate (H), b/s | 1.6179 | 2.5440 | 3.5059 |
| Quantization error (D), dB | 6.6442 | 13.8439 | 19.9534 |
| Uniform distribution | | | |
| Bit rate (H), b/s | 1.6080 | 2.3227 | 3.0830 |
| Quantization error (D), dB | 6.6470 | 12.5018 | 19.3640 |

TABLE 2

| Quantization resolution (r) | 2.0 | 1.0 | 0.5 |
|---|---|---|---|
| Rounding coefficient (b/r) | 0.3390 | 0.4150 | 0.4569 |
| Normal distribution | | | |
| Bit rate (H), b/s | 1.6069 | 2.5446 | 3.5059 |
| Quantization error (D), dB | 8.2404 | 14.2284 | 20.0495 |
| Uniform distribution | | | |
| Bit rate (H), b/s | 1.6345 | 2.3016 | 3.0449 |
| Quantization error (D), dB | 7.9208 | 12.8954 | 19.4922 |

According to Tables 1 and 2, a characteristic value SNR is improved by 0.1 dB at the quantization resolution of 0.5, by 0.45 dB at the quantization resolution of 1.0, and by 1.5 dB at the quantization resolution of 2.0.

Since a quantization method according to an embodiment updates only a search table of a quantization index based on a rounding coefficient, a complexity does not increase.

An operation of the envelope decoder 140 of FIG. 1 will now be described in more detail.

Context-based encoding of an envelope value is performed using delta coding. A quantization delta value between envelope values of a current sub-band and a previous sub-band may be represented by Equation 16.

$$d(i)=n_q(i+1)-n_q(i) \quad (16)$$

In Equation 16, d(i) denotes a quantization delta value of a sub-band (i+1), $n_q(i)$ denotes a quantization index of an envelope value of a sub-band (i), and $n_q(i+1)$ denotes a quantization index of an envelope value of the sub-band (i+1).

The quantization delta value d(i) of each sub-band is limited within a range [−15, 16], and as described below, a negative quantization delta value is first adjusted, and then a positive quantization delta value is adjusted.

First, quantization delta values d(i) are obtained in an order from a high frequency sub-band to a low frequency sub-band by using Equation 16. In this case, if d(i)<−15, adjustment is performed by $n_q(i)=n_q(i+1)+15$ (i=42, . . . , 0).

Next, quantization delta values d(i) are obtained in an order from the low frequency sub-band to the high frequency sub-band by using Equation 16. In this case, if d(i)>16, adjustment is performed by d(i)=16, $n_q(i+1)=n_q(i)+16$ (i=0, . . . , 42).

Finally, a quantization delta value in a range [0, 31] is generated by adding an offset 15 to all the obtained quantization delta values d(i).

According to Equation 16, when N sub-bands exist in a single frame, $n_q(0)$, d(0), d(1), d(2), . . . , d(N−2) are obtained. A quantization delta value of a current sub-band is encoded using a context model, and according to an embodiment, a quantization delta value of a previous sub-band may be used as a context. Since $n_q(0)$ of a first sub-band exists in the range [0, 31], the quantization delta value $n_q(0)$ is lossless encoded as it is by using 5 bits. When $n_q(0)$ of the first sub-band is used as a context of d(0), a value obtained from $n_q(0)$ by using a predetermined reference value may be used. That is, when Huffman coding of d(i) is performed, d(i−1) may be used as a context, and when Huffman coding of d(0) is performed, a value obtained by subtracting the predetermined reference value from $n_q(0)$ may be used as a context. The predetermined reference value may be, for example, a predetermined constant value, which is set in advance as an optimal value through simulations or experiments. The reference value may be included in a bitstream and transmitted or provided in advance in an encoding apparatus or a decoding apparatus.

According to an embodiment, the envelope encoder 140 may divide a range of a quantization delta value of a previous sub-band, which is used as a context, into a plurality of groups and perform Huffman coding on a quantization delta value of a current sub-band based on a Huffman table pre-defined for the plurality of groups. The Huffman table may be generated, for example, through a training process using a large database. That is, data is collected based on a predetermined criterion, and the Huffman table is generated based on the collected data. According to an embodiment, data of a frequency of a quantization delta value of a current sub-band is collected in a range of a quantization delta value of a previous sub-band, and the Huffman table may be generated for the plurality of groups.

Various distribution models may be selected using an analysis result of probability distributions of a quantization delta value of a current sub-band, which is obtained using a quantization delta value of a previous sub-band as a context, and thus, grouping of quantization levels having similar distribution models may be performed. Parameters of three groups are shown in Table 3.

TABLE 3

| Group number | Lower limit of quantization delta value | Upper limit of quantization delta value |
|---|---|---|
| #1 | 0 | 12 |
| #2 | 13 | 17 |
| #3 | 18 | 31 |

Figure 6:
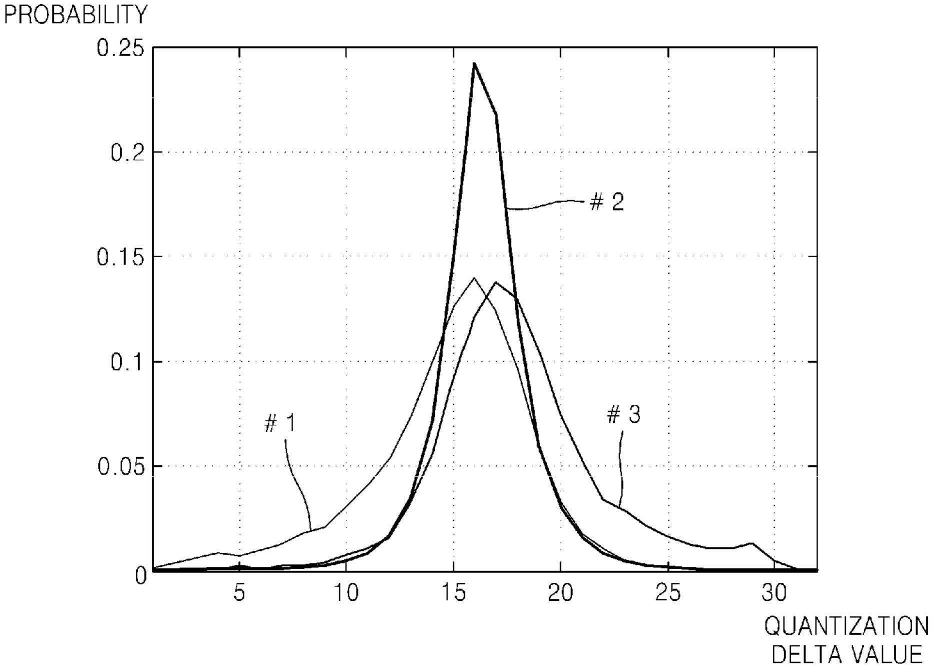
FIG. 6 is a graph showing probability distributions of three groups selected when a quantization delta value of a previous sub-band is used as a context.

Probability distributions of the three groups are shown in FIG. 6. A probability distribution of group #1 is similar to a probability distribution of group #3, and they are substantially reversed (or flipped) based on an x-axis. This indicates that the same probability model may be used for the two groups #1 and #3 without any loss in encoding efficiency. That is, the two groups #1 and #3 may use the same Huffman table. Accordingly, a first Huffman table for group #2 and a second Huffman table shared by the groups #1 and #3 may be used. In this case, an index of a code in the group #1 may be reversely represented against the group #3. That is, when a Huffman table for a quantization delta value d(i) of a current sub-band is determined as the group #1 due to a quantization delta value of a previous sub-band, which is a context, the quantization delta value d(i) of the current sub-band may be changed to d'(i)=A-d(i) by a reverse processing process in an encoding end, thereby performing Huffman coding by referring to a Huffman table for the group #3. In a decoding end, Huffman decoding is performed by referring to the Huffman table for the group #3, and a final value d(i) is extracted from d'(i) through a conversion process of d(i)=A-d'(i). Here, the value A may be set so that the probability distributions of the groups #1 and #3 are symmetrical to each other. The value A may be set in advance as an optimal value instead of being extracted in encoding and decoding processes. Alternatively, a Huffman table for the group #1 may be used instead of the Huffman table for the group #3, and it is possible to change a quantization delta value in the group #3. According to an embodiment, when d(i) has a value in the range [0, 31], the value A may be 31.

Figure 7:
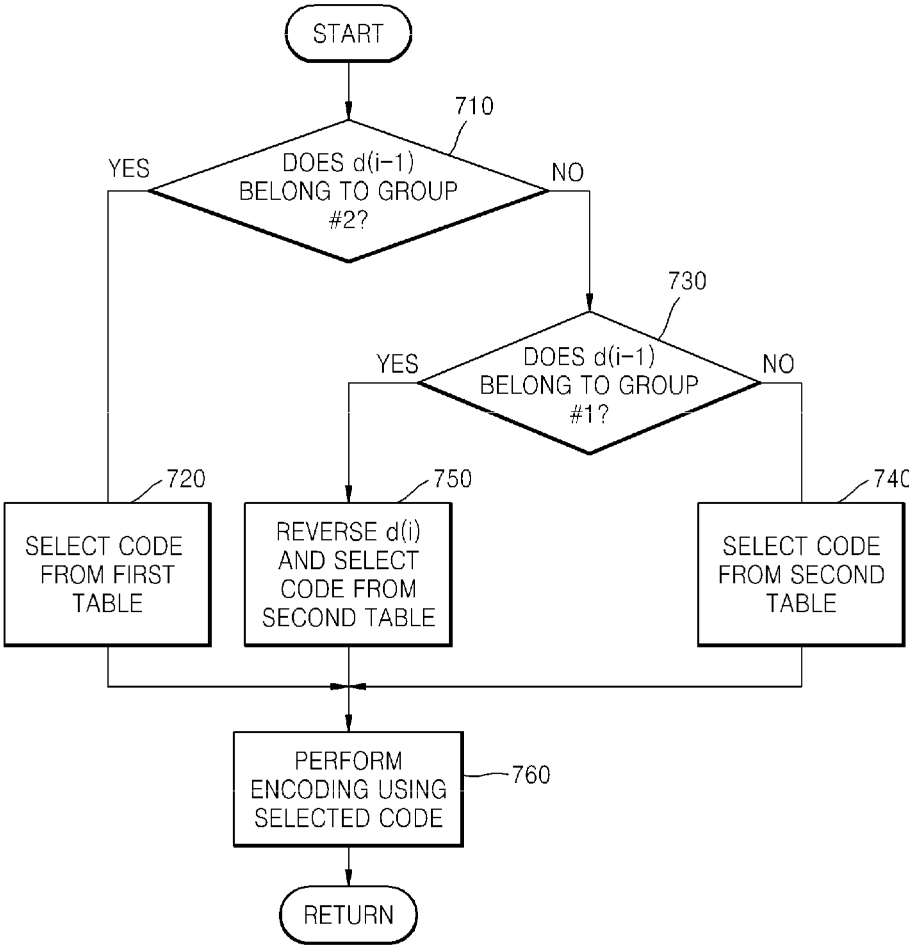
FIG. 7 is a flowchart illustrating a context-based encoding process in an envelope encoder of the digital signal processing apparatus of FIG. 1, according to an exemplary embodiment.

FIG. 7 is a flowchart illustrating a context-based Huffman encoding process in the envelope encoder 140 of the digital signal processing apparatus 100 of FIG. 1, according to an exemplary embodiment. In FIG. 7, two Huffman tables determined according to probability distributions of quantization delta values in three groups are used. In addition, when Huffman coding is performed on a quantization delta value d(i) of a current sub-band, a quantization delta value d(i−1) of a previous sub-band is used as a context, and for example, a first Huffman table for group #2 and a second Huffman table for group #3 are used.

Referring to FIG. 7, in operation 710, it is determined whether the quantization delta value d(i−1) of the previous sub-band belongs to the group #2.

In operation 720, a code of the quantization delta value d(i) of the current sub-band is selected from the first Huffman table if it is determined in operation 710 that the quantization delta value d(i−1) of the previous sub-band belongs to the group #2.

In operation 730, it is determined whether the quantization delta value d(i−1) of the previous sub-band belongs to group #1 if it is determined otherwise in operation 710 that the quantization delta value d(i−1) of the previous sub-band does not belong to the group #2.

In operation 740, a code of the quantization delta value d(i) of the current sub-band is selected from the second Huffman table if it is determined in operation 730 that the quantization delta value d(i−1) of the previous sub-band does not belong to the group #1, i.e., if the quantization delta value d(i−1) of the previous sub-band belongs to the group #3.

In operation 750, the quantization delta value d(i) of the current sub-band is reversed, and a code of the reversed quantization delta value d'(i) of the current sub-band is selected from the second Huffman table, if it is determined otherwise in operation 730 that the quantization delta value d(i−1) of the previous sub-band belongs to the group #1.

In operation 760, Huffman coding of the quantization delta value d(i) of the current sub-band is performed using the code selected in operation 720, 740, or 750.

Figure 8:
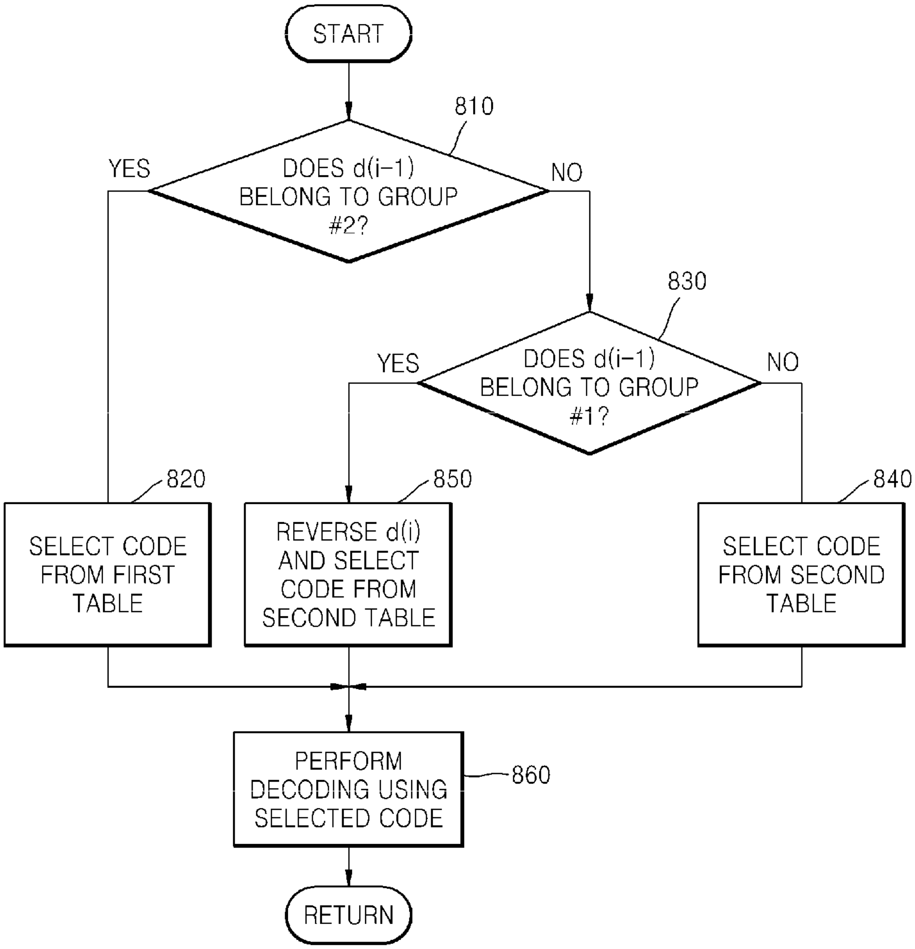
FIG. 8 is a flowchart illustrating a context-based decoding process in an envelope decoder of the digital signal processing apparatus of FIG. 2, according to an exemplary embodiment.

FIG. 8 is a flowchart illustrating a context-based Huffman decoding process in the envelope decoder 210 of the digital signal decoding apparatus 200 of FIG. 2, according to an exemplary embodiment. Like in FIG. 7, in FIG. 8, two Huffman tables determined according to probability distributions of quantization delta values in three groups are used. In addition, when Huffman coding is performed on a quantization delta value d(i) of a current sub-band, a quantization delta value d(i−1) of a previous sub-band is used as a context, and for example, a first Huffman table for group #2 and a second Huffman table for group #3 are used.

Referring to FIG. 8, in operation 810, it is determined whether the quantization delta value d(i−1) of the previous sub-band belongs to the group #2.

In operation 820, a code of the quantization delta value d(i) of the current sub-band is selected from the first Huffman table if it is determined in operation 810 that the quantization delta value d(i−1) of the previous sub-band belongs to the group #2.

In operation 830, it is determined whether the quantization delta value d(i−1) of the previous sub-band belongs to group #1 if it is determined otherwise in operation 810 that the quantization delta value d(i−1) of the previous sub-band does not belong to the group #2.

In operation 840, a code of the quantization delta value d(i) of the current sub-band is selected from the second Huffman table if it is determined in operation 830 that the quantization delta value d(i−1) of the previous sub-band does not belong to the group #1, i.e., if the quantization delta value d(i−1) of the previous sub-band belongs to the group #3.

In operation 850, the quantization delta value d(i) of the current sub-band is reversed, and a code of the reversed quantization delta value d'(i) of the current sub-band is selected from the second Huffman table, if t is determined otherwise in operation 830 that the quantization delta value d(i−1) of the previous sub-band belongs to the group #1.

In operation 860, Huffman decoding of the quantization delta value d(i) of the current sub-band is performed using the code selected in operation 820, 840, or 850.

A per-frame bit cost difference analysis is shown in Table 4. As shown in Table 4, encoding efficiency according to the embodiment of FIG. 7 increases by average 9% than an original Huffman coding algorithm.

TABLE 4

| Algorithm | Bit rate, kbps | Gain, % |
|---|---|---|
| Huffman coding | 6.25 | — |
| Context + Huffman coding | 5.7 | 9 |

Figure 9:
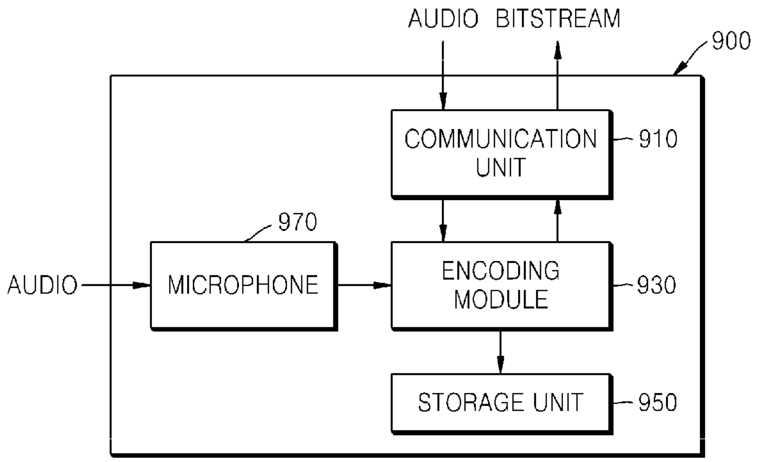
FIG. 9 is a block diagram of a multimedia device including an encoding module, according to an exemplary embodiment.

FIG. 9 is a block diagram of a multimedia device 900 including an encoding module 930, according to an exemplary embodiment.

The multimedia device 900 of FIG. 9 may include a communication unit 910 and the encoding module 930. In addition, according to the usage of an audio bitstream obtained as an encoding result, the multimedia device 900 of FIG. 9 may further include a storage unit 950 to store the audio bitstream. In addition, the multimedia device 900 of FIG. 9 may further include a microphone 970. That is, the storage unit 950 and the microphone 970 are optional. The multimedia device 900 of FIG. 9 may further include a decoding module (not shown), e.g., a decoding module to perform a general decoding function or a decoding module according to an exemplary embodiment. The encoding module 930 may be integrated with other components (not shown) included in the multimedia device 900 and implemented by at least one processor.

Referring to FIG. 9, the communication unit 910 may receive at least one of an audio signal and an encoded bitstream provided from the outside or may transmit at least one of a reconstructed audio signal and an audio bitstream obtained as a result of encoding of the encoding module 930.

The communication unit 910 is configured to transmit and receive data to and from an external multimedia device through a wireless network, such as wireless Internet, a wireless intranet, a wireless telephone network, a wireless Local Area Network (LAN), Wi-Fi, Wi-Fi Direct (WFD), third generation (3G), fourth generation (4G), Bluetooth, Infrared Data Association (IrDA), Radio Frequency Identification (RFID), Ultra WideBand (UWB), Zigbee, or Near Field Communication (NFC), or a wired network, such as a wired telephone network or wired Internet.

According to an embodiment, the encoding module 930 may generate a bitstream by transforming an audio signal in the time domain, which is provided through the communication unit 910 or the microphone 970, to an audio spectrum in the frequency domain, acquiring envelopes based on a predetermined sub-band for the audio spectrum, quantizing the envelopes based on the predetermined sub-band, obtaining a difference between quantized envelopes of adjacent sub-bands, and lossless encoding a difference value of a current sub-band by using a difference value of a previous sub-band as a context.

According to another embodiment, when an envelope is quantized, the encoding module 930 may adjust a boundary of a quantization area corresponding to a predetermined quantization index so that a total quantization error in the quantization area is minimized and may perform quantization using a quantization table updated by the adjustment.

The storage unit 950 may store the encoded bitstream generated by the encoding module 930. In addition, the storage unit 950 may store various programs required to operate the multimedia device 900.

The microphone 970 may provide an audio signal from a user or the outside to the encoding module 930.

Figure 10:
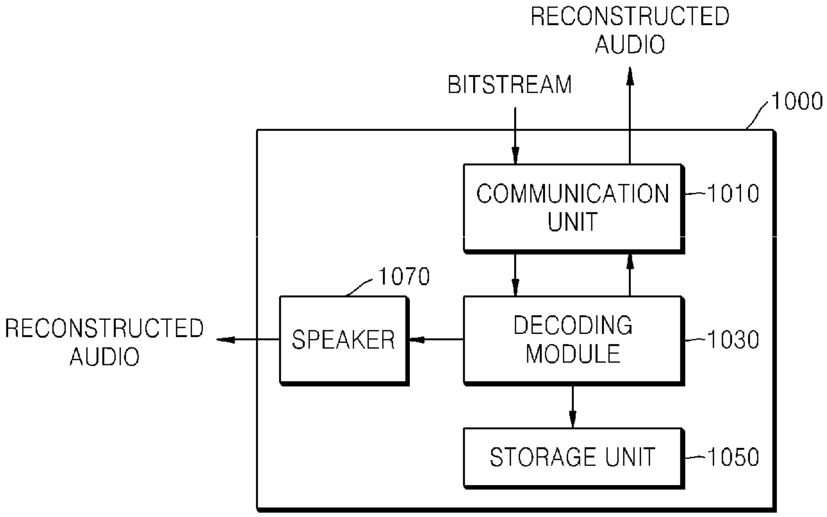
FIG. 10 is a block diagram of a multimedia device including a decoding module, according to an exemplary embodiment.

FIG. 10 is a block diagram of a multimedia device 1000 including a decoding module 1030, according to an exemplary embodiment.

The multimedia device 1000 of FIG. 10 may include a communication unit 1010 and the decoding module 1030. In addition, according to the usage of a reconstructed audio signal obtained as a decoding result, the multimedia device 1000 of FIG. 10 may further include a storage unit 1050 to store the reconstructed audio signal. In addition, the multimedia device 1000 of FIG. 10 may further include a speaker 1070. That is, the storage unit 1050 and the speaker 1070 are optional. The multimedia device 1000 of FIG. 10 may further include an encoding module (not shown), e.g., an encoding module for performing a general encoding function or an encoding module according to an exemplary embodiment. The decoding module 1030 may be integrated with other components (not shown) included in the multimedia device 1000 and implemented by at least one processor.

Referring to FIG. 10, the communication unit 1010 may receive at least one of an audio signal and an encoded bitstream provided from the outside or may transmit at least one of a reconstructed audio signal obtained as a result of decoding by the decoding module 1030 and an audio bitstream obtained as a result of encoding. The communication unit 1010 may be implemented substantially the same as the communication unit 910 of FIG. 9.

According to an embodiment, the decoding module 1030 may perform dequantization by receiving a bitstream provided through the communication unit 1010, obtaining a difference between quantized envelopes of adjacent sub-bands from the bitstream, lossless decoding a difference value of a current sub-band by using a difference value of a previous sub-band as a context, and obtaining quantized envelopes based on a sub-band from the difference value of the current sub-band reconstructed as a result of the lossless decoding.

The storage unit 1050 may store the reconstructed audio signal generated by the decoding module 1030. In addition, the storage unit 1050 may store various programs required to operate the multimedia device 1000.

The speaker 1070 may output the reconstructed audio signal generated by the decoding module 1030 to the outside.

Figure 11:
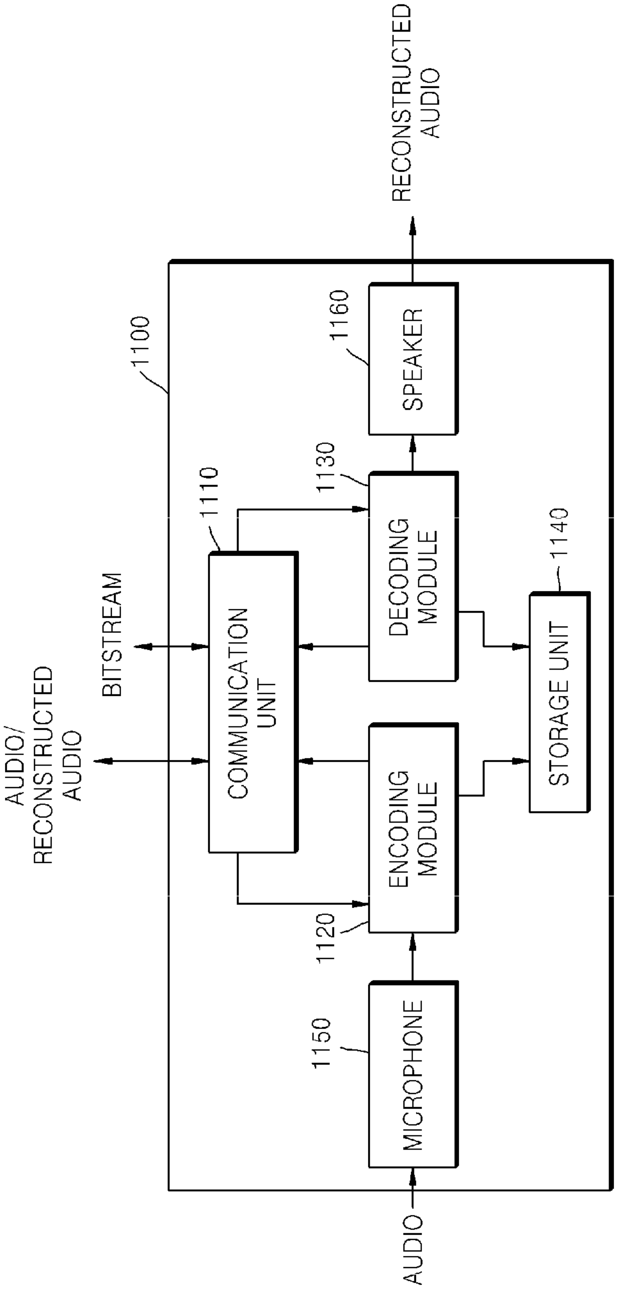
FIG. 11 is a block diagram of a multimedia device including an encoding module and a decoding module, according to an exemplary embodiment.

FIG. 11 is a block diagram of a multimedia device 1100 including an encoding module 1120 and a decoding module 1130, according to an exemplary embodiment.

The multimedia device 1100 of FIG. 11 may include a communication unit 1110, the encoding module 1120, and the decoding module 1130. In addition, according to the usage of an audio bitstream obtained as an encoding result or a reconstructed audio signal obtained as a decoding result, the multimedia device 1100 of FIG. 11 may further include a storage unit 1140 for storing the audio bitstream or the reconstructed audio signal. In addition, the multimedia device 1100 of FIG. 11 may further include a microphone 1150 or a speaker 1160. The encoding module 1120 and decoding module 1130 may be integrated with other components (not shown) included in the multimedia device 1100 and implemented by at least one processor.

Since the components in the multimedia device 1100 of FIG. 11 are identical to the components in the multimedia device 900 of FIG. 9 or the components in the multimedia device 1000 of FIG. 10, a detailed description thereof is omitted.

The multimedia device 900, 1000, or 1100 of FIG. 9, 10, or 11 may include a voice communication-only terminal including a telephone or a mobile phone, a broadcasting or music-only device including a TV or an MP3 player, or a hybrid terminal device of voice communication-only terminal and the broadcasting or music-only device, but is not limited thereto. In addition, the multimedia device 900, 1000, or 1100 of FIG. 9, 10, or 11 may be used as a client, a server, or a transformer disposed between the client and the server.

For example, if the multimedia device 900, 1000, or 1100 is a mobile phone, although not shown, the mobile phone may further include a user input unit such as a keypad, a user interface or a display unit for displaying information processed by the mobile phone, and a processor for controlling a general function of the mobile phone. In addition, the mobile phone may further include a camera unit having an image pickup function and at least one component for performing functions required by the mobile phone.

As another example, if the multimedia device 900, 1000, or 1100 is a TV, although not shown, the TV may further include a user input unit such as a keypad, a display unit for displaying received broadcasting information, and a processor for controlling a general function of the TV. In addition, the TV may further include at least one component for performing functions required by the TV.

The methods according to the exemplary embodiments can be written as computer-executable programs and can be implemented in general-use digital computers that execute the programs by using a non-transitory computer-readable recording medium. In addition, data structures, program instructions, or data files, which can be used in the embodiments, can be recorded on a non-transitory computer-readable recording medium in various ways. The non-transitory computer-readable recording medium is any data storage device that can store data which can be thereafter read by a computer system. Examples of the non-transitory computer-readable recording medium include magnetic storage media, such as hard disks, floppy disks, and magnetic tapes, optical recording media, such as CD-ROMs and DVDs, magneto-optical media, such as optical disks, and hardware devices, such as ROM, RAM, and flash memory, specially configured to store and execute program instructions. In addition, the non-transitory computer-readable recording medium may be a transmission medium for transmitting signal designating program instructions, data structures, or the like. Examples of the program instructions may include not only mechanical language codes created by a compiler but also high-level language codes executable by a computer using an interpreter or the like.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. An audio decoding method comprising:

receiving a bitstream including a coded quantization differential index of an envelope of a sub-band in an audio spectrum; and lossless decoding a coded quantization differential index of a current sub-band, by referring one of a plurality of tables based on a context which is obtained from a decoded quantization differential index of a previous sub-band, wherein the one of the plurality of tables is selected by one among a plurality of groups which are determined by the context.

2. The audio decoding method of claim 1, wherein the envelope is one of average energy, average amplitude, power, and a norm value of a corresponding sub-band.

3. A non-transitory computer-readable recording medium storing a computer-readable program for executing the audio decoding method of claim 1.

4. The audio decoding method of claim 1, wherein the lossless decoding is performed by referring the plurality of tables including a first table for a second group and a second table for sharing to first and third groups, where the first to third groups are obtained by grouping a decoded quantization differential index corresponding to the context.

5. The audio decoding method of claim 4, wherein the context obtained from the decoded quantization differential index of the previous sub-band is used as it is or after reversing, when the second table is shared.

6. The audio decoding method of claim 1, wherein the lossless decoding comprises decoding a coded quantization index of a first sub-band in which the previous sub-band does not exist as it is and decoding a coded quantization differential index of a second sub-band next to the first sub-band based on the decoded quantization index of the first sub-band and a predetermined reference value.

7. An audio decoding apparatus comprising:

at least one processor configured to:

receive a bitstream including a coded quantization differential index of an envelope of a sub-band in an audio spectrum; and lossless decode a coded quantization differential index of a current sub-band, by referring one of a plurality of tables based on a context which is obtained from a decoded quantization differential index of a previous sub-band, wherein the one of the plurality of tables is selected by one among a plurality of groups which are determined by the context.

8. The audio decoding apparatus of claim 7, wherein the at least one processor is configured to decode a coded quantization index of a first sub-band in which the previous sub-band does not exist as it is and decode a coded quantization differential index of a second sub-band next to the first sub-band based on a the decoded quantization index of the first sub-band and a predetermined reference value.

9. The audio decoding apparatus of claim 7, wherein the envelope is one of average energy, average amplitude, power, and a norm value of a corresponding sub-band.

10. The audio decoding apparatus of claim 7, wherein the at least one processor is configured to perform the lossless decoding by referring the plurality of tables including a first table for a second group and a second table for sharing to first and third groups, where the first to third groups are obtained by grouping a decoded quantization differential index corresponding to the context.

11. The audio decoding apparatus of claim 10, wherein the context obtained from the decoded quantization differential index of the previous sub-band is used as it is or after reversing, when the second table is shared.

* * * * *